(12) United States Patent
Barnes et al.

(10) Patent No.: US 11,687,464 B2
(45) Date of Patent: Jun. 27, 2023

(54) ADDRESS TRANSLATION IN A DATA PROCESSING APPARATUS

(71) Applicant: ARM LIMITED, Cambridge (GB)

(72) Inventors: Graeme Peter Barnes, Cambridge (GB); Catalin Theodor Marinas, Cambridge (GB); William James Deacon, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/648,041

(22) PCT Filed: Jan. 23, 2019

(86) PCT No.: PCT/GB2019/050189
§ 371 (c)(1),
(2) Date: Mar. 17, 2020

(87) PCT Pub. No.: WO2019/150077
PCT Pub. Date: Aug. 8, 2019

(65) Prior Publication Data
US 2020/0264983 A1    Aug. 20, 2020

(30) Foreign Application Priority Data

Jan. 31, 2018  (GB) ...................................... 1801598

(51) Int. Cl.
*G06F 12/10*  (2016.01)
(52) U.S. Cl.
CPC ........ *G06F 12/10* (2013.01); *G06F 2212/657* (2013.01)

(58) Field of Classification Search
CPC . G06F 12/1475; G06F 12/10; G06F 2212/657
(Continued)

(56) References Cited

U.S. PATENT DOCUMENTS

| 4,218,743 A | * | 8/1980 | Hoffman | ............. G06F 12/1018 |
| | | | | 711/202 |
| 4,774,659 A | * | 9/1988 | Smith | ................. G06F 12/1036 |
| | | | | 711/208 |

(Continued)

FOREIGN PATENT DOCUMENTS

| CN | 104520825 | 4/2015 |
| EP | 2 851 804 | 3/2015 |

(Continued)

OTHER PUBLICATIONS

International Search Report and Written Opinion of the ISA for PCT/GB2019/050189, dated Apr. 8, 2019, 14 pages.

(Continued)

*Primary Examiner* — Gautam Sain
*Assistant Examiner* — Edward Waddy, Jr.
(74) *Attorney, Agent, or Firm* — Nixon & Vanderhye P.C.

(57) ABSTRACT

An apparatus comprises address translation circuitry (70) to perform a translation of a virtual address (80) comprising a virtual tag portion (88) and a virtual address portion (86) into a physical address (82) comprising a physical tag portion (92) and a physical address portion (90). The address translation circuitry comprises address tag translation circuitry (72) to perform a translation of the virtual tag portion into the physical tag portion and the address translation to be performed is selected in dependence on the virtual address.

16 Claims, 9 Drawing Sheets

(58) Field of Classification Search
USPC .................................................. 711/203, 206
See application file for complete search history.

(56) References Cited

U.S. PATENT DOCUMENTS

| | | | | |
|---|---|---|---|---|
| 5,307,477 | A * | 4/1994 | Taylor | G06F 12/0888 |
| | | | | 711/122 |
| 5,341,485 | A * | 8/1994 | Hattersley | G06F 12/1036 |
| | | | | 711/201 |
| 5,574,877 | A | 11/1996 | Dixit et al. | |
| 6,230,248 | B1 | 5/2001 | Burger et al. | |
| 6,308,247 | B1 * | 10/2001 | Ackerman | G06F 12/1036 |
| | | | | 711/208 |
| 6,598,050 | B1 | 7/2003 | Bourekas | |
| 6,604,187 | B1 * | 8/2003 | McGrath | G06F 12/1036 |
| | | | | 711/209 |
| 6,792,521 | B2 | 9/2004 | Arimilli et al. | |
| 7,296,136 | B1 * | 11/2007 | Collard | G06F 12/0897 |
| | | | | 711/208 |
| 9,086,973 | B2 * | 7/2015 | Vorbach | G06F 12/0893 |
| 9,218,289 | B2 * | 12/2015 | Rychlik | G06F 12/0837 |
| 9,298,731 | B2 * | 3/2016 | Grunwald | G06F 16/13 |
| 2003/0074540 | A1 * | 4/2003 | Arimilli | G06F 9/342 |
| | | | | 711/204 |
| 2004/0260907 | A1 * | 12/2004 | Ozaki | G06F 12/109 |
| | | | | 711/209 |
| 2012/0297109 | A1 * | 11/2012 | Guthrie | G06F 9/4552 |
| | | | | 711/3 |
| 2013/0254477 | A1 * | 9/2013 | Swanson | G06F 3/0689 |
| | | | | 711/112 |
| 2015/0278100 | A1 * | 10/2015 | Sundaram | G06F 9/3836 |
| | | | | 711/137 |
| 2017/0329718 | A1 * | 11/2017 | Rose | G06F 12/1027 |

FOREIGN PATENT DOCUMENTS

| | | |
|---|---|---|
| JP | H02-15345 | 1/1990 |
| JP | 2002-366425 | 12/2002 |
| TW | 200519590 | 6/2005 |
| WO | 2013/078085 | 5/2013 |

OTHER PUBLICATIONS

Search and Examination Report for GB1801598.2, dated Jul. 25, 2018, 7 pages.
Gumpertz, Richard H,, "Error Detection with Memoty Tags" Dec. 1981, Dissertations. Paper 533, 119 pages.
Office Action for TW Application No. 108102492 dated Jun. 28, 2022 and English translation, 17 pages.
Office Action for IN Application No. 202047036708 dated Jun. 6, 2022, 6 pages.
Office Action for IL Application No. 275728 dated Dec. 5, 2022, 4 pages.
Office Action for JP Application No. 2020-540422 dated Dec. 27, 2022 and English translation, 5 pages.
Office Action for JP Application No. 2020-540422 dated Apr. 14, 2023 and English translation, 5 pages.

* cited by examiner

ADDRESS TRANSLATION IN A DATA PROCESSING APPARATUS

This application is the U.S. national phase of International Application No. PCT/GB2019/050189 filed Jan. 23, 2019 which designated the U.S. and claims priority to GB Patent Application No. 1801598.2 filed Jan. 31, 2018, the entire contents of each of which are hereby incorporated by reference.

The present technique relates to the field of data processing.

A data processing system may employ two addressing systems, namely a system of virtual addresses and a system of physical addresses. The virtual addresses are those used by the software executed by the data processing apparatus, whereas the physical addresses are those used by memory storage hardware such as an external RAM. Address translation capability may then be provided by the data processing apparatus in order to allow translation between these two memory addressing systems, and in particular to allow the executing software to access memory storage locations in the hardware without having to make use of the physical address system used by that hardware. In other words, the virtual to physical address translation may be transparent to the software running on the CPU, in that memory access requests (e.g. loads and stores) are issued using the virtual addresses and (when appropriate to the memory access) data is returned from the memory system without the software needing to be aware that an address translation took place and the data has been accessed at a physical address which differed from the virtual address.

At least some examples provide an apparatus comprising an address translation circuitry to perform a translation of a virtual address comprising a virtual tag portion and a virtual address portion into a physical address comprising a physical tag portion and a physical address portion, the address translation circuitry comprising: address tag translation circuitry to perform a translation of the virtual tag portion into the physical tag portion, wherein the address translation circuitry selects the translation to be performed by the address tag translation circuitry in dependence on the virtual address.

At least some examples provide a method comprising selecting a translation to be performed on a virtual address comprising a virtual tag portion and a virtual address portion into a physical address comprising a physical tag portion and a physical address portion, wherein the selecting of the translation is dependent on the virtual address; and perform the translation to translate the virtual tag portion into the physical tag portion.

At least some examples provide a computer program for controlling a host data processing apparatus to provide an instruction execution environment for execution of instructions of target program code, comprising: address translation program logic to perform a translation of a virtual address comprising a virtual tag portion and a virtual address portion into a physical address comprising a physical tag portion and a physical address portion, the address translation program logic comprising: address tag translation program logic to perform a translation of the virtual tag portion into the physical tag portion, wherein the address translation program logic selects the translation to be performed by the address tag translation circuitry in dependence on the virtual address.

A storage medium may store the computer program described above. The storage medium may be a non-transitory storage medium.

The present techniques will be described further, by way of example only, with reference to embodiments thereof as illustrated in the accompanying drawings, to be read in conjunction with the following description, in which.

In one example there is an apparatus comprising address translation circuitry to perform a translation of a virtual address comprising a virtual tag portion and a virtual address portion into a physical address comprising a physical tag portion and a physical address portion, the address translation circuitry comprising: address tag translation circuitry to perform a translation of the virtual tag portion into the physical tag portion, wherein the address translation circuitry selects the translation to be performed by the address tag translation circuitry in dependence on the virtual address.

A virtual address which is to be translated into a physical address may be defined in a virtual address space having a greater bit-width than is strictly necessary to define a unique virtual address for use by the processor core. For example, in a contemporary architecture, configured to use a 64-bit address space for its instruction set, the processor core may be constrained only to use, say, the lower 48 bits of the 64-bit address space, with the bits above this reserved in some manner. This approach can be advantageous, since for example user space and kernel space can each have their own defined region of virtual addresses which do not overlap. For example in a system in which the user space and the kernel space each have their own defined 39 bit address space (providing $2^{39}$=512 GB virtual addresses each), one approach is then to label these sets of user virtual addresses and kernel virtual addresses by means of the leading set of bits, so that for example all user virtual addresses have 25 leading zeros and all kernel virtual addresses have 25 leadings ones. For example these may be set as a sign extension of the most significant "real" address bit (so that the spare portion is set to all zeros or all ones). Examination of the leading bit portion of a virtual address used by either the user or the kernel can provide a verification that an allowed memory access is being made and to trap illegal accesses.

Nevertheless, where (at least a large portion of) the leading bit portion of a virtual address is therefore essentially not used, this provides the opportunity for this bit space to be made use of for another purpose. However this then means that an encoding used in an upper part of a virtual address may be affected by the manner in which the virtual address space is used. In the above mentioned example of the virtual address space having a portion reserved for user space and a portion reserved for kernel space, where a leading portion of bits of the virtual address (set to all zeros or all ones) indicates whether a given address is reserved for user space or kernel space, the default bit encoding for this upper portion of the virtual address therefore differs for user space and kernel space.

Further, where this upper portion of the virtual address space is largely unused, it may be advantageous to make use of this bit space to enable the software to signal additional information to the memory system. In this context the apparatus provided comprises address translation circuitry to translate virtual addresses into physical addresses, which distinguishes between a virtual tag portion and a virtual address portion of a received virtual address when performing the translation and transforms a virtual address into a physical address which comprises a physical tag portion and a physical address portion. In other words, a virtual address portion is translated into a physical address portion in order to indicate a specific memory address to which the software requires access, but a further part of the virtual address, i.e. the virtual tag portion, is separately translated into a physical tag portion and this physical tag portion can then convey further information to the memory address system. Further, when performing this translation of the virtual tag portion into the physical tag portion, the apparatus of the present techniques takes the content of the virtual address into account when determining what kind of translation is to be performed by the address tag translation circuitry. In other words a different translation can be used depending on some feature of the virtual address.

This dependence on the virtual address for the translation which is to be performed by the address tag translation circuitry may be configured in a variety of ways, but in some examples the translation performed by the address tag translation circuitry is dependent on a most-significant bit of the virtual address portion. It will be recognised that the meaning of this most-significant bit of the virtual address portion may vary depending on the particular implementation, and indeed on a choice as to where the boundary between the virtual tag portion and the virtual address portion in the virtual address lies.

The manner in which the selected translation depends on the most significant bit of the virtual address portion may take a variety of forms, but in some examples, when the most-significant bit of the virtual address portion has a first value the selected translation performed by the address tag translation circuitry generates the physical tag portion matching the virtual tag portion, and when the most-significant bit has a second value the selected translation performed by the address tag translation circuitry modifies the virtual tag portion to generate the physical tag portion. Thus, when the most significant bit has the first value the address tag translation circuitry does not modify the virtual tag portion to generate the physical tag portion. However, when the most significant bit has the second value a modification of the virtual tag portion is carried out in order to generate the physical tag portion.

As mentioned above, the meaning of the most significant bit of the virtual address portion can vary. However, in some examples the apparatus is arranged to allocate virtual addresses for exclusive use by one of kernel-owned processes and user-owned processes, and a value of the most-significant bit of the virtual address portion can be indicative of whether the virtual address has been allocated to kernel-owned processes or to user-owned processes. This may for example be as part of a system as mentioned above in which two distinct and non-overlapping portions of the full virtual address space are respectively allocated to kernel processes and to user owned processes, in which, by default, the apparatus is arranged, say, to populate the upper portion of a virtual address with a contiguous set of ones for kernel space addresses and to populate this same portion with a contiguous set of zeros for user space addresses. In the context of the present techniques this then means that the address translation circuitry may be configured to apply no translation to a virtual tag portion when it is identified that it forms part of a virtual address which has been allocated as part of the user space, whilst applying a translation to the virtual tag portion when it is identified that the virtual address has been allocated in the kernel space. Where the virtual tag portion does not form part of the true address itself, but rather may be used to communicate other information to the memory system (possibly related to a specific memory address or possibly as a more general command or signal to the memory system), this approach therefore enables the generation of the physical tag portion to take into account whether the address belongs to a kernel owned process or to a user owned process.

This dependency may be variously configured, but in some examples, the selected translation performed by the address tag translation circuitry comprises inverting at least a portion of the virtual tag portion to generate the physical tag portion. Such a configuration may for example be used when addressing within the apparatus is configured such that, by default, the virtual tag portion is populated by a contiguous set of ones for kernel-owned addresses, and with a contiguous set of zeros for user-owned addresses. Thus, when at least a portion of the virtual tag portion is used to communicate information to the memory address system this inversion of this at least a portion of the virtual tag portion enables the encoding of information presented to the memory address system to be the same regardless of whether the virtual address belongs to a kernel owned process or a user owned process.

In other examples, the selected translation performed by the address tag translation circuitry may comprise incrementing at least a portion of the virtual tag portion to generate the physical tag portion. This may for example be applicable in configurations in which addresses in the virtual address space are allocated to different processes such that some are allocated at the lowest possible value of the address space whilst others are allocated to other processes at the very top of the address space. For example, in the above described user space/kernel space demarcation of the virtual address space an address comprising a full set (e.g. 64 bits) of zeros may be allocated to user space whilst an address with a full set of ones may be allocated to kernel space. If the highest possible address (all ones) is incremented then this value will wrap-around (there being modulo $2^{64}$ possible addresses) to give a contiguous sequence of 64 zeros. Note however that this translation only applies to the virtual tag portion and therefore, in this example, a contiguous set of ones in the virtual tag portion will be translated into a contiguous set of zeros in the physical tag portion. The continguous sequence of ones in the virtual address portion remains a contiguous sequence of ones in the physical address portion.

In some examples the apparatus further comprises a memory system to receive the physical address and to access a memory location identified by the physical address portion, wherein the memory system is responsive to reception of the physical address, when a predetermined part of the physical tag portion has a predetermined value, to perform a predetermined memory operation. Accordingly, the physical tag portion, and by extension the virtual tag portion, can be used to cause the memory system to perform a predetermined memory operation. This provides the processor core with a useful control mechanism with respect to the memory system.

The predetermined memory operation may take a wide variety of forms depending on the system requirements and the particular implementation, but in some examples the predetermined memory operation is a guard tag comparison of the physical tag portion against a guard tag value associated with the memory location and the memory system is responsive the physical tag portion and the guard tag value not satisfying a match condition to indicate a fault condition. Thus in such an apparatus guard tags are provided which are stored in the memory system in association with the memory locations specified by the physical address portions and a requirement that the physical tag portion and guard tag value satisfy a match condition enables control to be exerted over access to the memory location. The fault condition which indicates that the match condition has not been met may be used in a variety of ways. For example, it could be used to prevent access to that memory location, but this is not the only manner in which it could be used and in other examples the fault condition could merely be signalled to another part of the apparatus (for example back to the processor core) to indicate that the match condition was not met, but still allowing the access to proceed. Thus, the outcome of the comparison between the physical tag portion and the guard tag value can be used to control whether the memory access is allowed to succeed, or whether subsequent operations can succeed, or could merely be reported while allowing memory accesses to continue as normal.

In such a configuration where the memory system is configured to perform such guard tag checking, use may be made of at least part of the physical tag portion in order to control a particular manner in which the guard tag comparison is to be carried out. In some examples, when a predetermined part of the physical tag portion has a predetermined value the match condition is a match-all condition such that any guard tag value will satisfy the match condition. In effect, therefore, this disables the signalling of the fault condition, since any guard tag value will satisfy the match condition and therefore the fault condition will not be generated.

In some examples, when the predetermined part of the physical tag portion does not have the predetermined value, the match condition is a match-one condition such that the predetermined part of the physical tag portion and the guard tag value must be the same to satisfy the match condition. Thus, conversely, the predetermined part of the physical tag portion may explicitly be required to satisfy the match condition if it does not have the above-mentioned "match-all" value. The predetermined part of the physical tag portion can therefore be used to specify a particular value which the guard tag value must have in order to satisfy the match condition. For example, this may be used by the system to categorise memory addresses, for example in dependence on the particular processes to which those memory addresses have been allocated, such that only a process to which a particular memory address has been allocated may access that memory address without triggering the fault condition.

The predetermined part of the physical tag portion may be variously defined but in some examples the predetermined part of the physical tag portion is a predetermined set of bits of the physical tag portion. This predetermined set of bits may be variously defined but may for example be a set of four bits (to take just one illustrative example) such that 16 different permutations may be defined, for example leaving one as the above-mentioned "match-all" value and where the remainder can then individually be used as "match-one" values allowing 15 different categorisations of memory addresses to be defined in the system. Generally, any number of bits of the physical tag portion could be used in this manner, correspondingly allowing a larger or smaller set of categorisations to be defined.

Where it will be understood that this above-mentioned "match-all" value is distinct in its effect on the memory system from the set of "match-one" values, the address tag translation circuitry may be arranged to force the generation of the predetermined part of the physical tag portion having the predetermined value under various circumstances. For example in some examples the address tag translation circuitry is responsive to a predetermined bit of the virtual tag portion having a predetermined value to generate the physical tag portion with the predetermined part of the physical tag portion having the predetermined value irrespective of values of other predetermined bits of the virtual tag portion. In this manner the predetermined bit of the virtual tag portion thus acts as a control bit to force the "match-all" comparison to be carried out by the memory system.

The predetermined part of the physical tag portion which triggers the match-all comparison to be carried out may be variously defined, but in some embodiments the predetermined part of the physical tag portion is a predetermined bit of the physical tag portion. The signal to the memory system as to whether to carry out a match-all comparison or not can thus be communicated by only a single bit of the physical tag portion (potentially leaving other bits of the physical tag portion to communicate other information to the memory system).

The guard tag comparison between the physical tag portion and the guard tag value may be variously configured, but in some examples the guard tag comparison is of less than all of the physical tag portion against the guard tag value associated with the memory location.

Further, the predetermined value of the predetermined part of the physical tag portion may be variously defined, but in some examples the virtual tag portion comprises at least one bit which is included in the physical address and the memory system is responsive to the at least one bit to control overwriting of the guard tag associated with the memory location when a write access is made to the memory location. Thus, the process defining the bits of the virtual tag portion may use this at least one bit to communicate to the memory system how a write access is to be made to the memory location, and in this example to control overwriting of the guard tag associated with the memory location when the write access is made. In principle when a write access is made to a memory location it is not essential for the guard tag associated with that memory location to be updated, since generally it should not change if the processes accessing memory locations are respecting the defined guard tag allocations, however controlling overwriting of the guard tag provides an additional level of verification that the process performing the write access is correctly allowed to do so by forcing the guard tag value to be overwritten when the write access is made.

In some examples there is a method comprising selecting a translation to be performed on a virtual address comprising a virtual tag portion and a virtual address portion into a physical address comprising a physical tag portion and a physical address portion, wherein the selecting of the translation is dependent on the virtual address; and perform the translation to translate the virtual tag portion into the physical tag portion.

In some examples there is a computer program comprising address translation program logic to perform a translation of a virtual address comprising a virtual tag portion and a virtual address portion into a physical address comprising a physical tag portion and a physical address portion, the address translation program logic comprising: address tag translation program logic to perform a translation of the virtual tag portion into the physical tag portion, wherein the address translation program logic selects the translation to be performed by the address tag translation circuitry in dependence on the virtual address.

In some examples there is a storage medium storing the computer program described above, wherein this storage medium may be a non-transitory storage medium.

Some particular embodiments are now described with reference to the figures.

Figure 1:
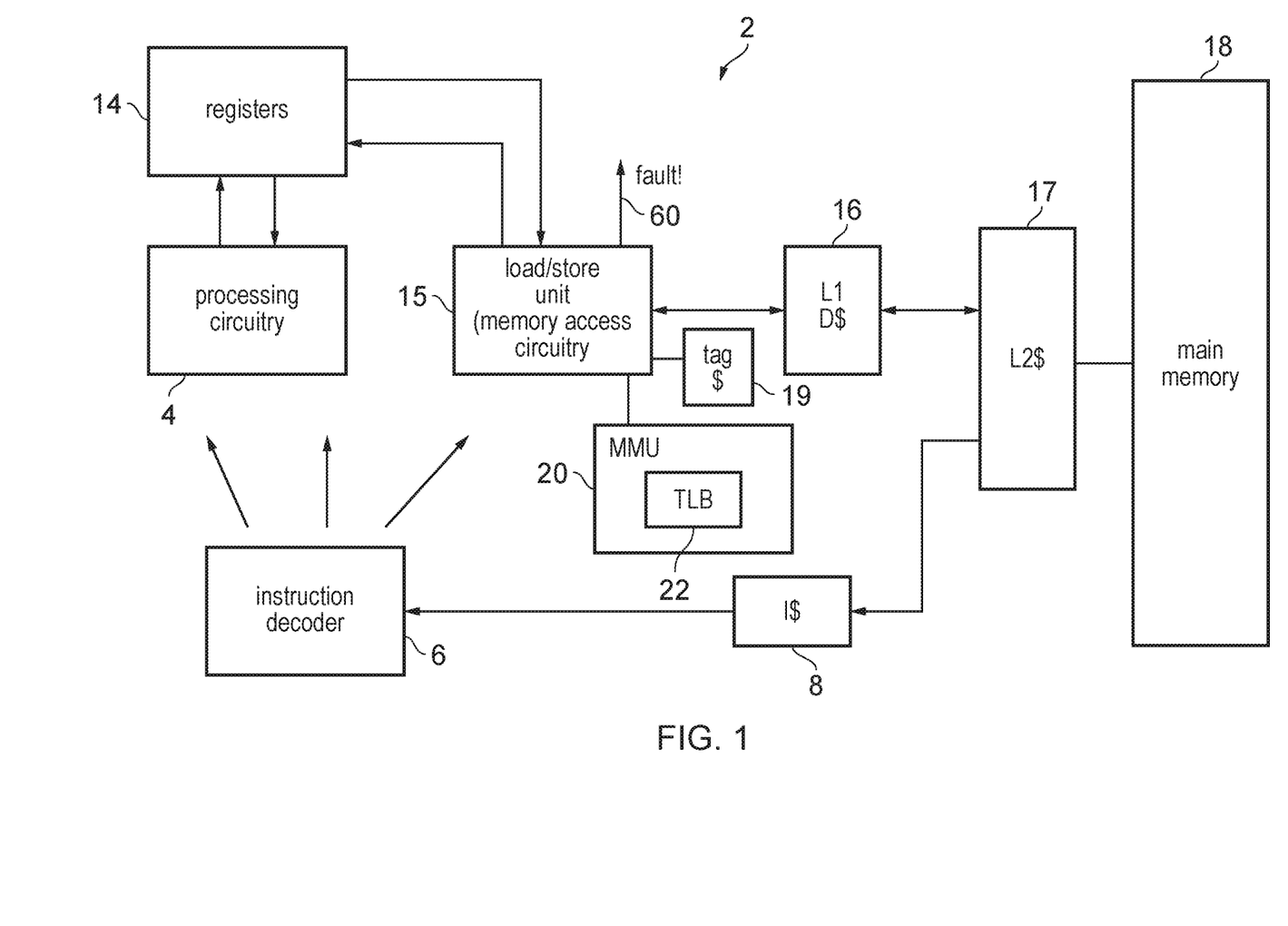
FIG. 1 schematically illustrates an example of a data processing apparatus.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes memory access circuitry (e.g. including a load/store unit) 15 for controlling transfer of data between the registers 14 and the memory system. In this example, the memory system includes the instruction cache 8, a level 1 (L1) data cache 16, a level 2 (L2) cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page tables stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
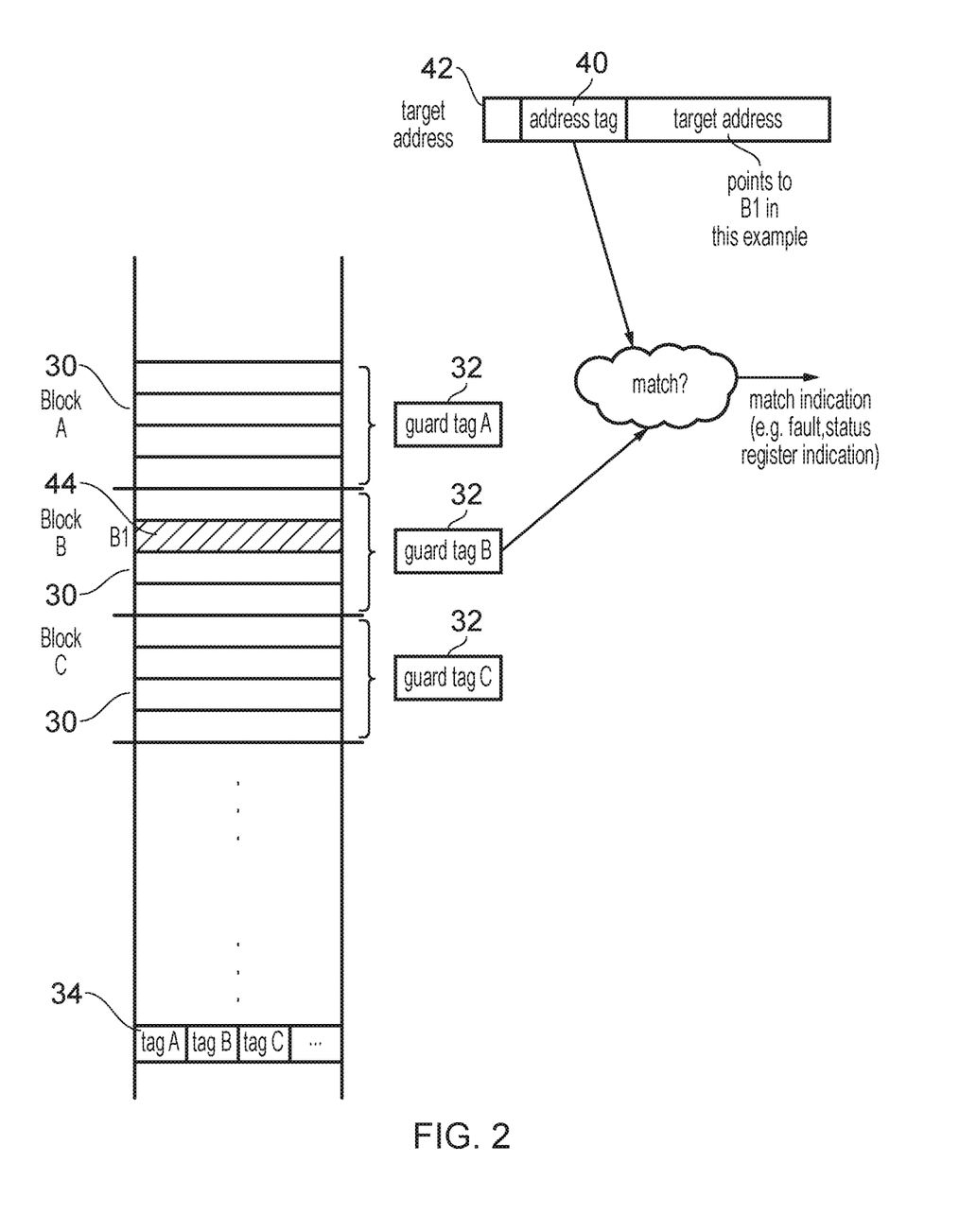
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18, which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro-architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro-architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), can be compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler, for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, a comparison is made between the address tag 40 and the guard tag 32 associated with a block 30 including the addressed location 44, and a determination as to whether they match. It should be noted that in the example configuration of FIG. 1 the comparison could be performed anywhere between the load/store unit 15 and the physical memory 18 (and indeed could be distributed along that path). However in this example, the comparison is described for simplicity in terms of it being carried out by the load/store unit 15. The load/store unit 15 generates a match indication indicating whether the address tag 40 and the guard tag 32 matched. For example, this match indication could be a fault signal 60, which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
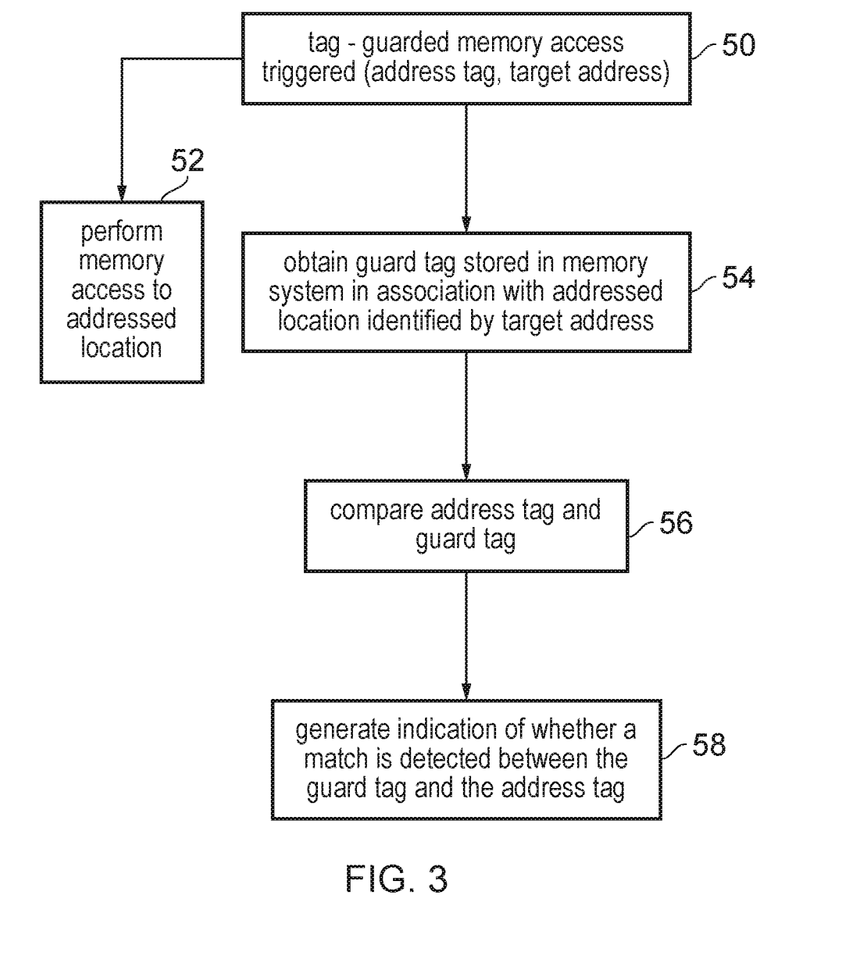
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory accesses is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
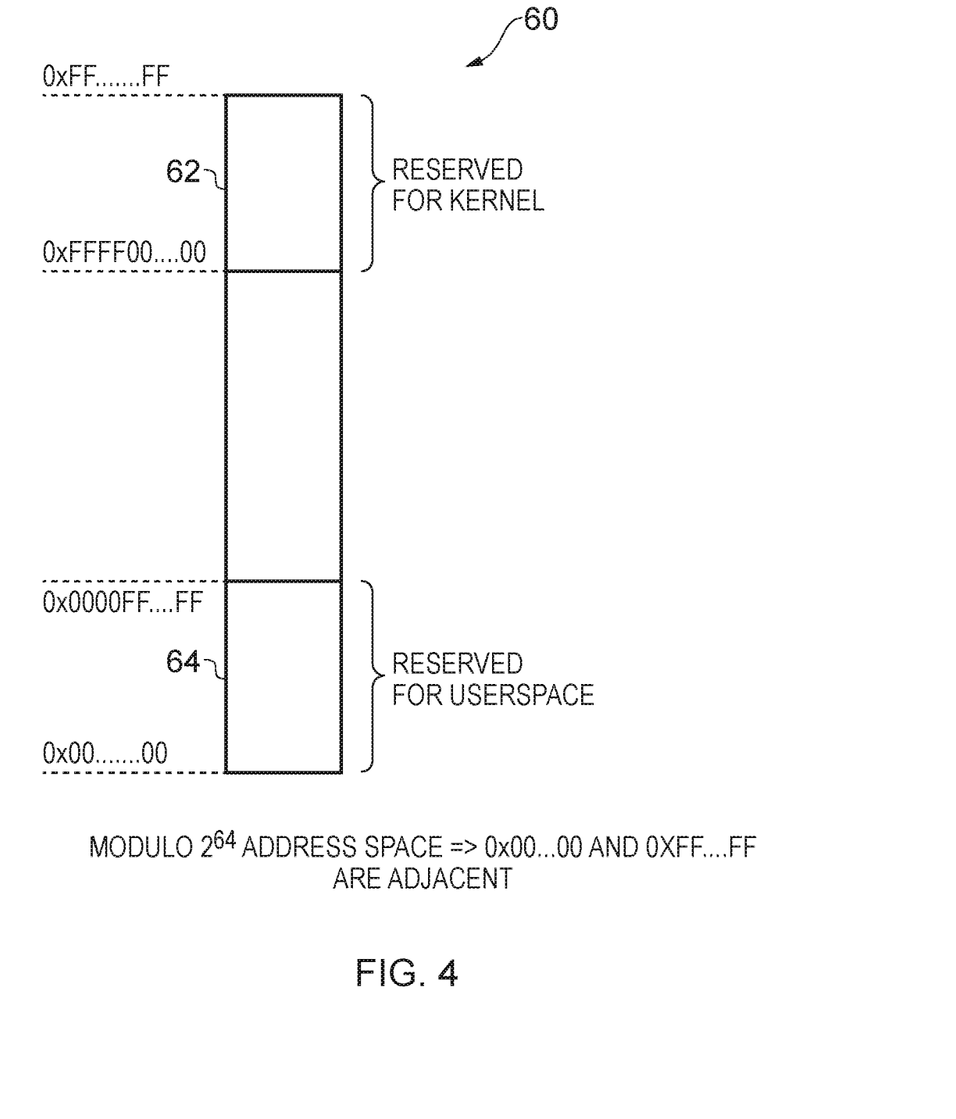
FIG. 4 schematically illustrates a virtual address space in which one portion is reserved for use by a kernel and another portion is reserved for user space.

FIG. 4 schematically illustrates a representation of a virtual address space 60 which may be used in example embodiments. The figure shows the full range of virtual addresses which may be specified in this 64-bit address space, wherein an upper portion 62 is indicated as being reserved for kernel use, whilst a lower portion 64 is indicated as being reserved as user space. Accordingly, virtual addresses in the kernel space have a leading (most significant) set of contiguous ones, whilst virtual addresses in the user space have a corresponding contiguous set of leading zeros. As further noted in the figure reference to this virtual address space is made in a modulo $2^{64}$ manner, such that the lowest address (0x00 . . . 00) and the highest address (0xFF . . . FF) that can be defined in this space are "adjacent" to one another, in that incrementing a reference to a virtual address above the 0xFF . . . FF address wraps-around to the lowest defined address 0x00 . . . 00.

Figure 5:
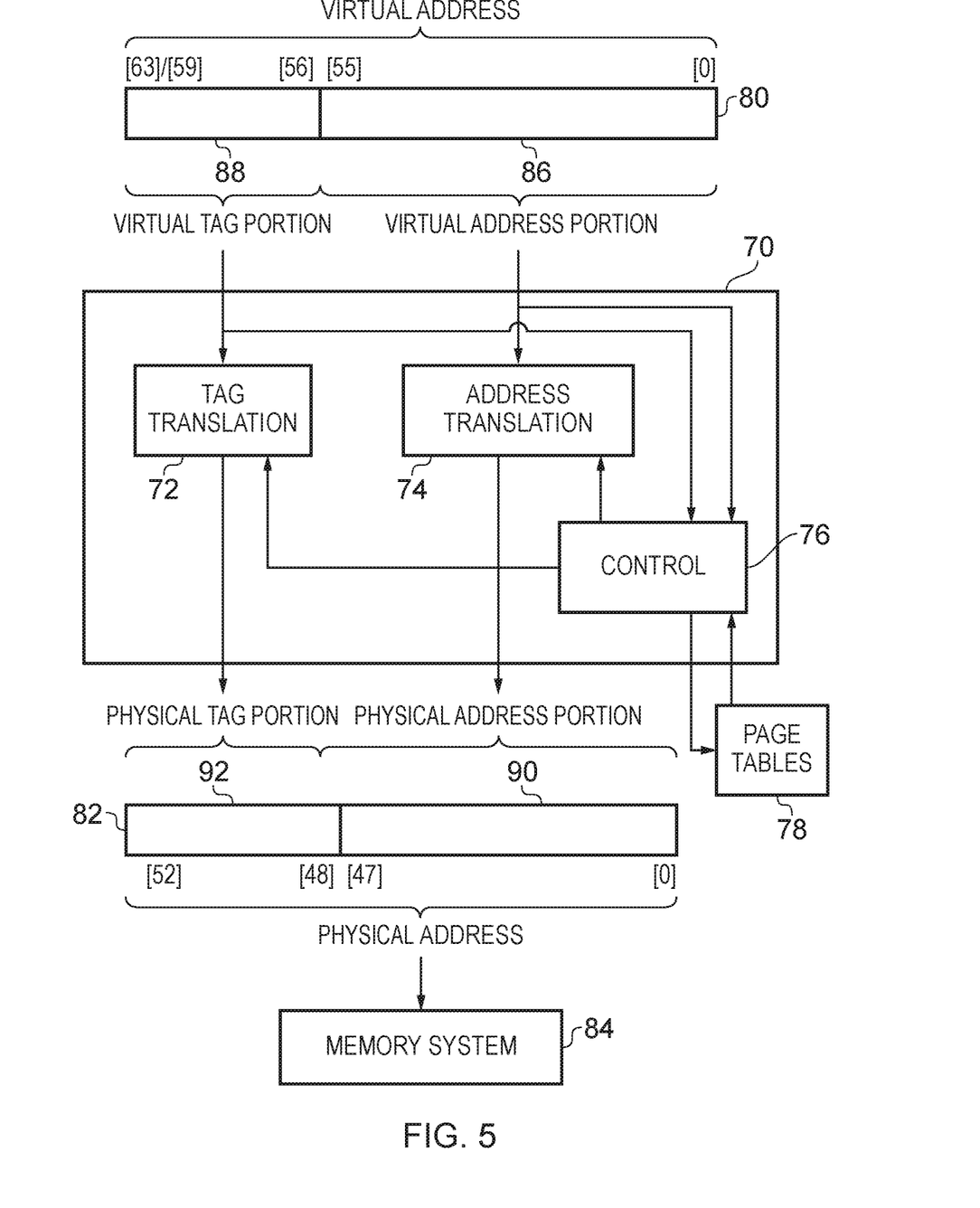
FIG. 5 schematically illustrates an example of a data processing apparatus comprising address translation circuitry and address tag translation circuitry.

As mentioned above, virtual addresses used within the processor core (i.e. for example within the processing circuitry 4) are translated into physical addresses used in the hardware of the memory system and FIG. 5 schematically illustrates example circuitry provided to support this. The apparatus 70 shown comprises tag translation circuitry 72, address translation circuitry 74 and control circuitry 76. The control circuitry 76 controls the operation of the tag translation circuitry 72 and the address translation circuitry 74. When necessary, the control circuitry 76 also makes reference to entries in page tables 78 storing defined translations between virtual and physical addresses. Thus a virtual address 80 received by the apparatus 70 is translated into a physical address 82 which is then passed further into the memory system 84 for the relevant physical address to be accessed as required. A virtual address 80 is handled in two parts, namely a virtual address portion 86 and a virtual tag portion 88. In the illustrated example, the virtual address is 64-bit and bits [55:0] form the virtual address portion and bits [63:56] form the virtual tag portion. Note that FIG. 5 shows that the highest bit of the virtual tag portion may alternatively be considered to be bit [59], if for example bits [63:60] of a 64-bit address are simply not used in a particular implementation. Thus the virtual address portion is received by the address translation circuitry 74 in the apparatus 70 and, under the control of control circuitry 76, this virtual address is translated into a corresponding physical address in the manner with which one of ordinary skill in the art will be familiar. However, in addition the virtual tag portion 88 is received by the tag translation circuitry 72 of the apparatus 70 and this circuitry can translate the virtual tag portion into a physical tag portion 92. More detail of this virtual tag to physical tag translation is described below with reference to FIGS. 6, 7 and 8.

Figure 6:
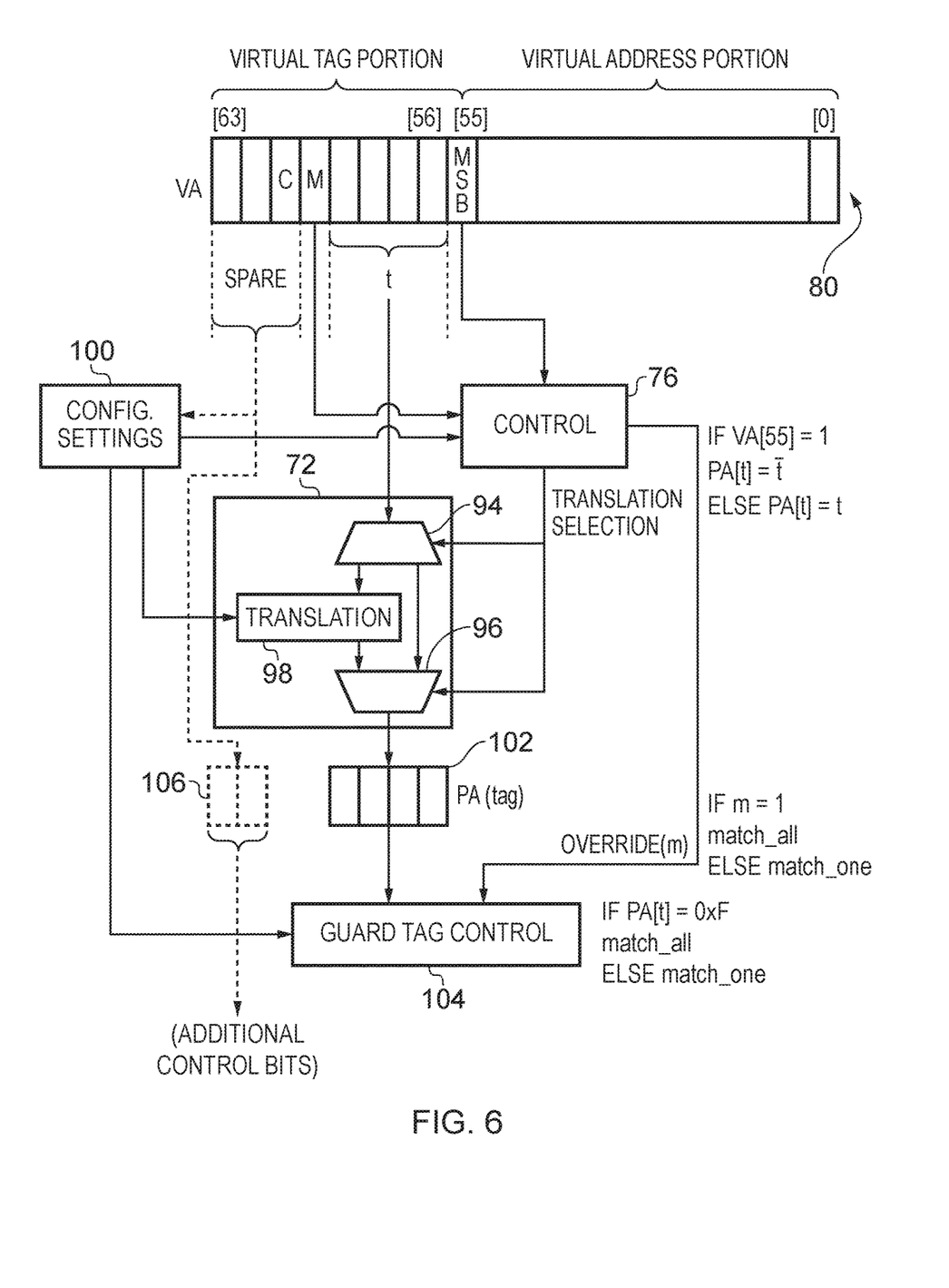
FIG. 6 schematically illustrates some components of a data processing apparatus in one example giving more detail of the translation of a virtual tag portion into a physical tag portion.

FIG. 6 schematically illustrates in more detail an example of circuitry provided to translate a virtual tag portion into a physical tag portion. As in the example of FIG. 5 the virtual address 80 is shown comprising a virtual tag portion (comprising bits [63:56]) and the virtual address portion (comprising bits [55:0]). Within the virtual tag portion the bits may have different uses and, as shown in the figure, the lowest four bits of the virtual tag portion ([59:56]) labelled "t" form the virtual tag portion which is subject to the translation. The remaining bits of the virtual tag portion above this ([63:60]) serve a different function as will be described in more detail below. The set of bits "t" of the virtual tag portion is received by the tag translation circuitry 72 which provides two possible paths for this set of bits. Which of these paths is followed is determined by the setting of the multiplexers 94, 96 under the control of the control circuitry 76. Essentially this is either a direct path through the tag translation circuitry or one that proceeds via configurable translation circuitry 98. In the example shown the control circuitry 76 makes the translation selection based on the most significant bit (bit [55]) of the virtual address portion. Thus, when this bit is set the path via the translation circuitry 98 is chosen, whilst when this bit is not set the direct path through the tag translation circuitry 72 is selected. This control is shown on the right of FIG. 6 by the logical statement: if VA[55]=1 PA[t]=t-bar else PA[t]=t. In other words when bit 55 is set, t is inverted, otherwise t is propagated unamended. An inversion is however not the only translation which may be performed and the translation performed by the translation circuitry 98 can be varied in dependence on configuration settings 100. In another example the translation may be an increment of the value represented by the part t, and other translations are equally conceivable. The manner in which the apparatus operates may also be affected by other bits within the virtual tag portion. As shown in FIG. 6 another bit (labelled m) is also received by the control circuitry 76. Here an example is given of the physical address being generated for use in a memory system, which comprises tag-guarded memory access (as for example described above with reference to FIGS. 2 and 3) under the control of the guard tag control circuitry, and the additional bit "m" may be made use of in order to exert control over the manner in which that tag-guarded memory access is carried out. In the example shown in FIG. 6 the "m" bit determines whether the set of four bits 102 generated by the tag translation circuitry 72 is used by the memory system to define a "match_all" or a "match_one" condition. In other words, depending on the setting of this m bit either the tag guarded memory access will require a match between the physical address tag for bits 102 and the guard tag stored in association with the relevant memory address (in a match_one condition) or will essentially allow any address tag set of bits to satisfy the match (in the match_all condition).

Generally the remaining part of the virtual tag portion may be considered "spare" as labelled in the figure, although in some examples one or more bits of this spare part (e.g. as labelled "c" in the figure) may additionally be made use of to provide one or more additional control bits which are settable in the virtual tag portion and may be conveyed to the memory system and/or influence the configuration setting of the apparatus. Hence, as shown (as an alternative with dashed lines) in the figure these spare bits may determine the configuration settings 100 and also may provide, for example, two additional bits 106 which are passed into the memory system as additional control bits. Finally, note that the guard tag control circuitry 104 is generally configured so that when a particular bit combination of the set of bits 102 is received (in the physical tag) that a "match_all" condition is set. In the example shown this is when all bits are set. This is also shown by the logical statement on the lower right of FIG. 6: if PA[t]=0xF match_all else match_one. Recalling that the virtual addresses may be allocated in a system in which (as shown in FIG. 4) a portion of the available virtual address space is reserved for user space and another portion is reserved for kernel space, and that this provides a default meaning for the upper portion of the full (e.g. 64-bit) virtual address, the translation carried out by the translation circuitry 72, controlled by the most significant bit of the virtual address portion (bit [55]) can therefore provide that the same predetermined "match_all" bit combination (in this example 0xF) can be provided to the memory control system regardless of whether the virtual address has been allocated for kernel space or for user space. In other example configurations a five bit physical tag may be used, where one bit is devoted to indicating if a "match_all" or a "match_one" comparison should be carried out, and the other four bits are used for that compassion if "match_one" is configured.

Figure 7:
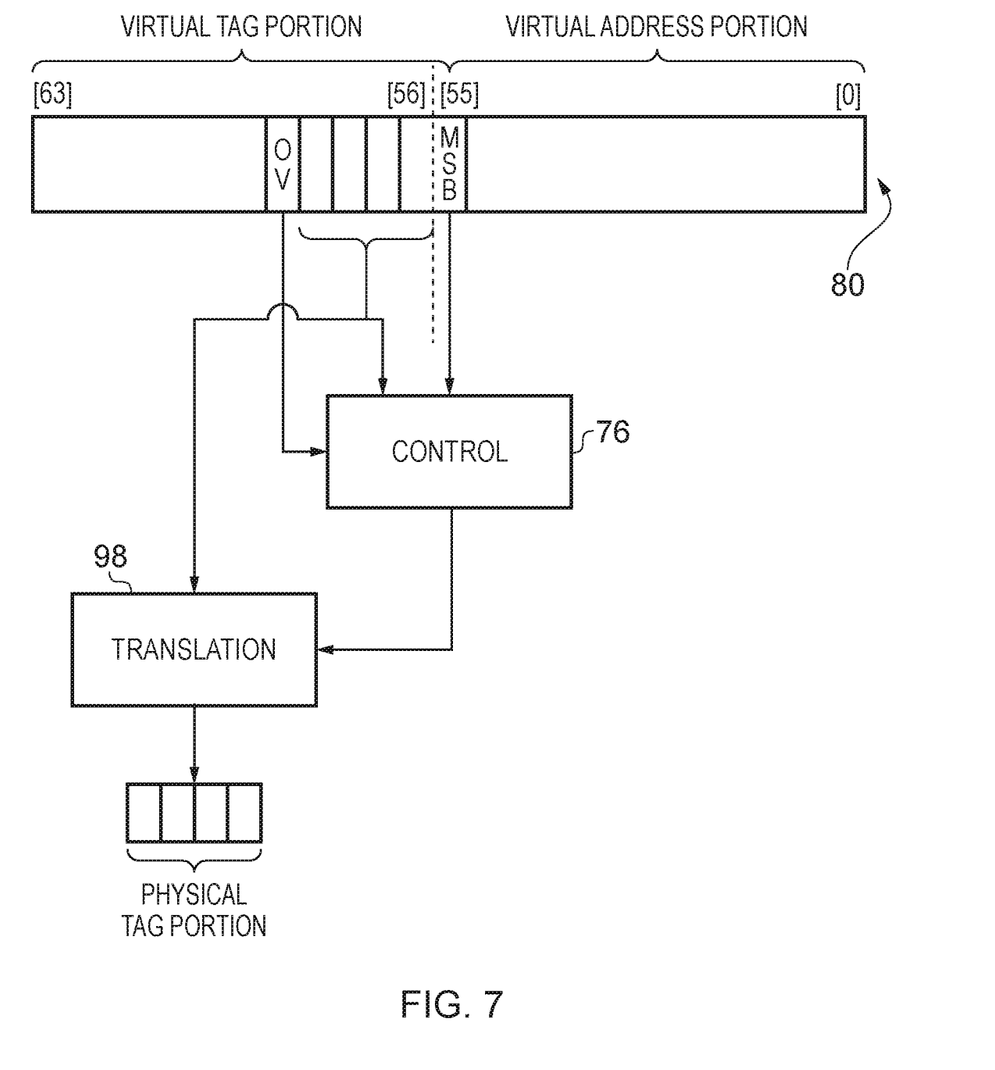
FIG. 7 schematically illustrates some components of the data processing apparatus of FIG. 6 in one example.

FIG. 7 is another schematic illustration of some of the circuitry shown in FIG. 6, here showing a variant on the control of the translation circuitry 98 by the control circuitry 76. The control circuitry 76 receives a particular bit of the virtual tag portion (labelled "OV"—override), which can be used to force a particular bit (or bit combination) to be generated by the translation circuitry 98 in the physical tag portion. This can for example be used to force the match_all comparison to be carried out. In principle however any purpose could be served by the forced bit (or bit combination) generated by the translation circuitry 98 in the physical tag portion, whether as part of a tag-guarded memory access, or related to another memory operation, and the override bit (OV) in the virtual tag portion can be used to trigger this.

In one example an approach is taken wherein a choice is made of at most one of the virtual tag encodings based on the most-significant bit of the virtual address portion, which is defined as a "match_all" physical tag encoding. Whether this "match_all" comparison is carried out can also be based on other contextual configurations. For example, it can be configured for all user tags to be "match_one", it can be configured for user tag "0" to be "match_all", it can be configured for all kernel tags to be "match_one", and it can be configured for kernel tag "1111" to be match all.

Figure 8:
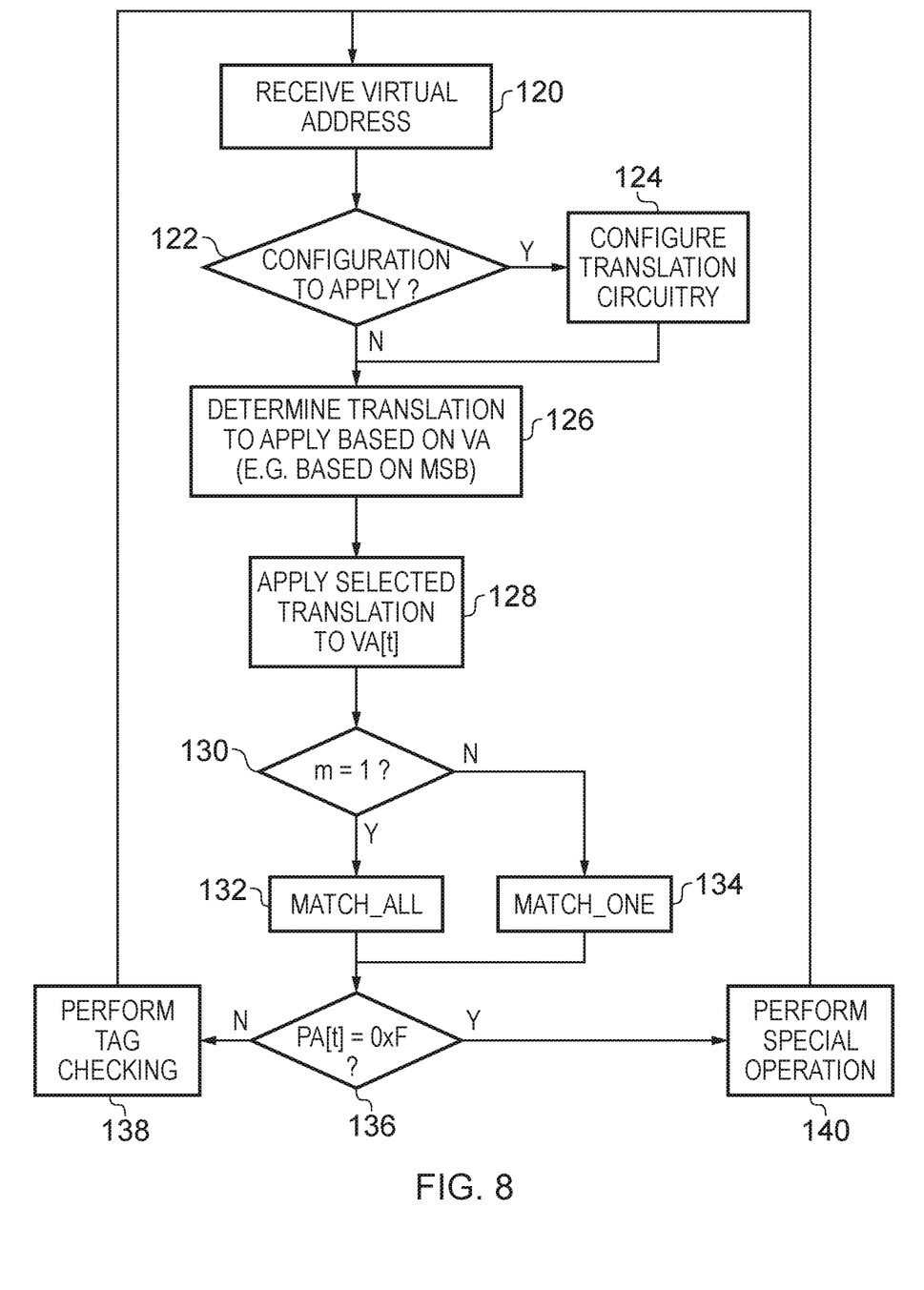
FIG. 8 is a flow diagram illustrating a method of translating a virtual tag portion into a physical tag portion.

FIG. 8 is a flow diagram showing a sequence of steps which are carried out in one example. At step 120 a new virtual address to be translated is received. At step 122 it is determined if there is a particular configuration to apply to the translation circuitry (for example by means of spare bits within the virtual tag portion) and when this is the case this occurs at step 124. At step 126 the translation to be applied to the virtual tag portion is determined based on the virtual address portion of the virtual address (for example based on its most significant bit). The selected translation is then applied at step 128 to a part of the virtual tag portion (in order to generate a corresponding physical tag portion). At step 130 it is determined if the bit "m" is 1, this determines whether a match_all comparison will be performed (step 132) or whether a match_one comparison (step 134) will be carried out. Finally, at step 136 it is determined if the generated set of bits in the physical address tag portion correspond to a predetermined special value, in this example, this being a contiguous set of ones (0xF). When this is the case the flow proceeds to step 140 where this triggers a special operation within the memory system, whereas when this is not the case the flow proceeds via step 138 where the "normal" tag guarded memory accesses is carried out with the comparison being checked as match_all or match_one as determined at step 130. The flow then returns to step 120.

Figure 9:
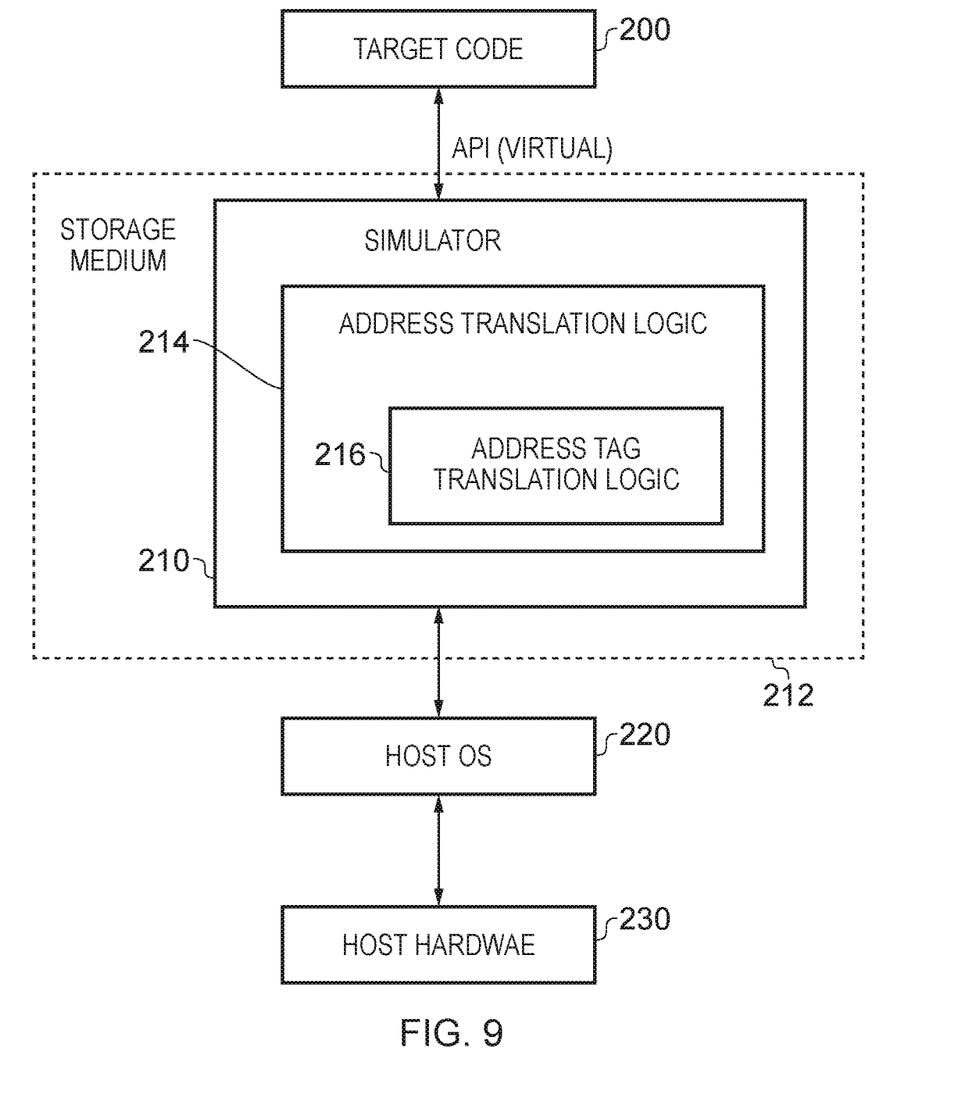
FIG. 9 shows an example of a simulator supporting address translation logic.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 2 discussed above, and in particular the tag translation circuitry 72, can emulate these features. For example, the simulator program 210 may include address translation logic 214 for translating virtual addresses into physical addresses, and may particularly include address translation logic 216 for translating virtual address tag portions into physical address tag portions. Thus the simulator program 210 may also include memory access program logic for performing the comparison of a guard tag and an address tag and reporting whether any mismatch between the guard tag and the address tag has been detected. Also, the simulator program 110 may include tag setting program logic, which comprises instructions for setting the guard tags in a corresponding way to the way in which a hardware embodiment would set the tags.

In brief overall summary, an apparatus comprises address translation circuitry to perform a translation of a virtual address comprising a virtual tag portion and a virtual address portion into a physical address comprising a physical tag portion and a physical address portion. The address translation circuitry comprises address tag translation circuitry to perform a translation of the virtual tag portion into the physical tag portion and the translation to be performed by the address tag translation circuitry is selected in dependence on the virtual address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
   address translation circuitry configured to perform a translation of a virtual address comprising a virtual tag portion and a virtual address portion into a physical address comprising a physical tag portion and a physical address portion, the physical address portion identifying a memory location to which access is required and the physical tag portion indicating whether to perform a predetermined memory operation, and the address translation circuitry comprising:
   address tag translation circuitry configured to perform a translation of the virtual tag portion into the physical tag portion,
   wherein the address translation circuitry is configured to select the translation to be performed by the address tag translation circuitry in dependence on the virtual address portion, and
   wherein the virtual tag portion and the virtual address portion are non-overlapping portions of the virtual address, and the physical tag portion and the physical address portion are non-overlapping portions of the physical address; and
   a memory system configured to receive the physical address and to access the memory location identified by the physical address portion, wherein the memory system is responsive to reception of the physical address, when a predetermined part of the physical tag portion has a predetermined value, to perform the predetermined memory operation,
   wherein the predetermined memory operation is a guard tag comparison of the physical tag portion against a guard tag value associated with the memory location and the memory system is responsive to the physical tag portion and the guard tag value not satisfying a match condition to indicate a fault condition.

2. The apparatus as claimed in claim 1, wherein the translation performed by the address tag translation circuitry is dependent on a most-significant bit of the virtual address portion.

3. The apparatus as claimed in claim 2, wherein when the most-significant bit of the virtual address portion has a first value, the selected translation performed by the address tag translation circuitry is configured to generate the physical tag portion matching the virtual tag portion,
   and wherein when the most-significant bit has a second value, the selected translation performed by the address tag translation circuitry is configured to modify the virtual tag portion to generate the physical tag portion.

4. The apparatus as claimed in claim 2, wherein the apparatus is arranged to allocate virtual addresses for exclusive use by one of kernel-owned processes and user-owned processes, and a value of the most-significant bit of the virtual address portion is indicative of whether the virtual address has been allocated to kernel-owned processes or to user-owned processes.

5. The apparatus as claimed in claim 1, wherein the selected translation configured to be performed by the address tag translation circuitry comprises inverting at least a portion of the virtual tag portion to generate the physical tag portion.

6. The apparatus as claimed in claim 1, wherein the selected translation configured to be performed by the address tag translation circuitry comprises incrementing at least a portion of the virtual tag portion to generate the physical tag portion.

7. The apparatus as claimed in claim 1, wherein when a predetermined part of the physical tag portion has a predetermined value, the match condition is a match-all condition such that any guard tag value will satisfy the match condition.

8. The apparatus as claimed in claim 7, wherein when the predetermined part of the physical tag portion does not have the predetermined value the match condition is a match-one condition such that the predetermined part of the physical tag portion and the guard tag value must be the same to satisfy the match condition.

9. The apparatus as claimed in claim 7, wherein the predetermined part of the physical tag portion is a predetermined set of bits of the physical tag portion.

10. The apparatus as claimed in claim 7, wherein the address tag translation circuitry is responsive to a predetermined bit of the virtual tag portion having a predetermined value to generate the physical tag portion with the predetermined part of the physical tag portion having the predetermined value irrespective of values of other predetermined bits of the virtual tag portion.

11. The apparatus as claimed in claim 7, wherein the predetermined part of the physical tag portion is a predetermined bit of the physical tag portion.

12. The apparatus as claimed in claim 1, wherein the guard tag comparison is of less than all of the physical tag portion against the guard tag value associated with the memory location.

13. The apparatus as claimed in claim 7, wherein the predetermined value of the predetermined part of the physical tag portion has all bits of a same bit-value.

14. The apparatus as claimed in claim 1, wherein the virtual tag portion comprises at least one bit which is included in the physical address and the memory system is responsive to the at least one bit to control overwriting of the guard tag associated with the memory location when a write access is made to the memory location.

15. A method comprising:
selecting a translation to be performed on a virtual address comprising a virtual tag portion and a virtual address portion into a physical address comprising a physical tag portion and a physical address portion, wherein the selecting of the translation is dependent on the virtual address portion, the physical address portion identifying a memory location to which access is required and the physical tag portion indicating whether to perform a predetermined memory operation; and performing the translation to translate the virtual tag portion into the physical tag portion, wherein the virtual tag portion and the virtual address portion are non-overlapping portions of the virtual address, and the physical tag portion and the physical address portion are non-overlapping portions of the physical address; and receiving the physical address and accessing the memory location identified by the physical address portion, and in response to reception of the physical address and a predetermined part of the physical tag portion having a predetermined value, performing the predetermined memory operation, wherein the predetermined memory operation is a guard tag comparison of the physical tag portion against a guard tag value associated with the memory location and the memory system is responsive to the physical tag portion and the guard tag value not satisfying a match condition to indicate a fault condition.

16. A non-transitory, computer-readable storage device storing a computer program for controlling a host data processing apparatus to provide an instruction execution environment for execution of instructions of target program code, comprising:

address translation program logic configured to perform a translation of a virtual address comprising a virtual tag portion and a virtual address portion into a physical address comprising a physical tag portion and a physical address portion, the physical address portion identifying a memory location to which access is required and the physical tag portion indicating whether to perform a predetermined memory operation, and the address translation program logic comprising:

address tag translation program logic configured to perform a translation of the virtual tag portion into the physical tag portion, wherein the address translation program logic is configured to select the translation to be performed by the address tag translation circuitry in dependence on the virtual address portion, and wherein the virtual tag portion and the virtual address portion are non-overlapping portions of the virtual address, and the physical tag portion and the physical address portion are non-overlapping portions of the physical address; and memory system program logic configured to receive the physical address and to access the memory location identified by the physical address portion, wherein the memory system program logic is responsive to reception of the physical address, when a predetermined part of the physical tag portion has a predetermined value, to perform the predetermined memory operation, wherein the predetermined memory operation is a guard tag comparison of the physical tag portion against a guard tag value associated with the memory location and the memory system is responsive to the physical tag portion and the guard tag value not satisfying a match condition to indicate a fault condition.

* * * * *